(12) United States Patent
Shao

(10) Patent No.: US 10,050,994 B2
(45) Date of Patent: Aug. 14, 2018

(54) METHOD AND COMPUTING DEVICE FOR PROCESSING DATA

(71) Applicant: TENCENT TECHNOLOGY (SHENZHEN) COMPANY LIMITED, Shenzhen (CN)

(72) Inventor: Yingzhe Shao, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 564 days.

(21) Appl. No.: 14/710,656

(22) Filed: May 13, 2015

(65) Prior Publication Data

US 2015/0244736 A1    Aug. 27, 2015

Related U.S. Application Data

(63) Continuation of application No. PCT/CN2013/086114, filed on Oct. 29, 2013.

(30) Foreign Application Priority Data

Nov. 21, 2012    (CN) .......................... 2012 1 0475462

(51) Int. Cl.

| H04L 29/06 | (2006.01) |
| G06F 9/445 | (2018.01) |
| G06F 21/57 | (2013.01) |
| H04L 29/08 | (2006.01) |

(52) U.S. Cl.

CPC ...... H04L 63/1441 (2013.01); G06F 9/44526 (2013.01); G06F 21/57 (2013.01); H04L 67/02 (2013.01)

(58) Field of Classification Search

USPC .......... 726/23, 2, 21, 36; 713/150, 163, 181; 380/264, 276

See application file for complete search history.

(56) References Cited

U.S. PATENT DOCUMENTS

| 7,747,785 B2 | 6/2010 | Baker, III et al. |
| 8,370,518 B2 | 2/2013 | Chen et al. |
| 2007/0174424 A1 * | 7/2007 | Chen ................... G06F 9/44526 709/217 |

(Continued)

FOREIGN PATENT DOCUMENTS

| CN | 1713573 A | 12/2005 |
| CN | 101604371 A | 12/2009 |

(Continued)

OTHER PUBLICATIONS

Search Report in International Application No. PCT/CN2013/086114 dated Feb. 20, 2014.

(Continued)

*Primary Examiner* — Sharif E Ullah

(74) *Attorney, Agent, or Firm* — Marshall, Gerstein & Borun LLP

(57) ABSTRACT

Disclosed is a method for processing data, which includes: obtaining grade of a plug-in; assigning the plug-in into one of a plurality of categories according to the grade of the plug-in; and displaying at least one operation indication and recommended operation information based on the category the plug-in belongs to. A computing device for processing data is also disclosed.

12 Claims, 6 Drawing Sheets

(56) References Cited

U.S. PATENT DOCUMENTS

| | | | | |
|---|---|---|---|---|
| 2011/0023092 | A1* | 1/2011 | Wen | G06F 21/51 |
| | | | | 726/4 |
| 2011/0058509 | A1* | 3/2011 | Wei | G06F 8/65 |
| | | | | 370/310 |
| 2013/0036212 | A1* | 2/2013 | Jibbe | H04L 67/1095 |
| | | | | 709/223 |
| 2013/0290708 | A1* | 10/2013 | Diaz | H04L 41/28 |
| | | | | 713/165 |
| 2014/0081901 | A1* | 3/2014 | Szymczak | G06F 9/44526 |
| | | | | 707/601 |

FOREIGN PATENT DOCUMENTS

| | | |
|---|---|---|
| CN | 102081709 A | 6/2011 |
| CN | 102207967 A | 10/2011 |
| CN | 102214104 A | 10/2011 |
| CN | 102663073 A | 9/2012 |

OTHER PUBLICATIONS

Office Action in Chinese Application No. 201210475462.X dated Apr. 6, 2016, 7 pages.
International Preliminary Report on Patentability and Written Opinion in International Application No. PCT/CN2013/086114 dated May 26, 2015, 5 pages.

* cited by examiner

US 10,050,994 B2

METHOD AND COMPUTING DEVICE FOR PROCESSING DATA

CROSS REFERENCE

This application is a continuation of an International application No PCT/CN2013/086114, filed on Oct. 29, 2013, which claims the benefit of Chinese Patent Application No. 201210475462.X, filed on Nov. 21, 2012, the disclosure of which is incorporated herein in its entirety by reference.

FIELD

The present disclosure relates to data processing technology, particularly to a method and a computing device for processing data.

BACKGROUND

Browser plug-ins are widely used as important means to rich browser functions. For example, the browser plug-ins may include: plug-ins facilitating searching operation of a user, such as Baidu Toolbar and Chinese Soso; Flash plug-ins which is indispensable to a user playing online games; and e-bank payment plug-ins. However, not all plug-ins are helpful to users. Sometimes after a plug-in is installed, pop-up advertisements will appear constantly, or the home page of the browser is tampered with and cannot be modified again. These kinds of plug-ins can be referred to as malicious plug-ins.

Now whether a plug-in is a useful plug-in or a malicious plug-in can only be determined by grading of the user after the plug-in is installed, so that the plug-ins with high grades can be retained, while the plug-ins with low grades should be cleaned away. While users now find that not all plug-ins with low grades are malicious plug-ins. One plug-in may be useless to some users, but may be useful to others. Therefore, if a uniform standard is used while cleaning away plug-ins, some useful plug-ins would be cleaned away. And the user has to re-install the cleaned-away plug-ins when he needs to use it.

SUMMARY

According to an example of the present disclosure, a method for processing data includes: obtaining grade of a plug-in; assigning the plug-in into one of a plurality of categories according to the grade of the plug-in; and displaying at least one operation indication and recommended operation information based on the category the plug-in belongs to.

According to another example of the present disclosure, a computing device for processing data includes: an obtaining unit, configured to obtain grade of a plug-in; a dividing unit, configured to assign the plug-in into one of a plurality of categories according to the grade of the plug-in; and a displaying unit, configured to display at least one operation indication and recommended operation information based on the category the plug-in belongs to.

According to still another example of the present disclosure, a computing device for processing data includes: one or more processors; a memory; and one or more programs stored in the memory and to be executed by the one or more processors, the one or more programs include instructions to: obtain grade of a plug-in; assign the plug-in into one of a plurality of categories according to the grade of the plug-in; and display at least one operation indication and recommended operation information based on the category the plug-in belongs to.

According to yet another example of the present disclosure, a non-transitory computer-readable storage medium comprising a set of instructions for processing data, the set of instructions to direct at least one processor to perform acts of: obtaining grade of a plug-in; assigning the plug-in into one of a plurality of categories according to the grade of the plug-in; and displaying at least one operation indication and recommended operation information based on the category the plug-in belongs to.

Other aspects or embodiments of the present disclosure can be understood by those skilled in the art in light of the description, the claims, and the drawings of the present disclosure.

BRIEF DESCRIPTION OF THE DRAWINGS

For a better understanding of the present disclosure, reference should be made to the Detailed Description below, in conjunction with the following drawings in which like reference numerals refer to corresponding parts throughout the figures.

DETAILED DESCRIPTION

Reference will now be made in detail to examples, which are illustrated in the accompanying drawings. In the following detailed description, numerous specific details are set forth in order to provide a thorough understanding of the present disclosure. Also, the figures are illustrations of an example, in which modules or procedures shown in the figures are not necessarily essential for implementing the present disclosure. In other instances, well-known methods, procedures, components, and circuits have not been described in detail so as not to unnecessarily obscure aspects of the examples.

According to an example of the present disclosure, a method for processing data by a computing device is provided. According to another example of the present disclosure, a computing device for processing data (hereinafter called as "computing device") is provided. By adopting the method or the computing device, plug-ins can be effectively managed, thus the utility of the plug-ins is improved. To be noted, the computing device mentioned in the present disclosure can be referred to a mobile phone, a personal computer (PC), a tablet PC or PAD, a laptop, or a large-scale computer.

Figure 1:
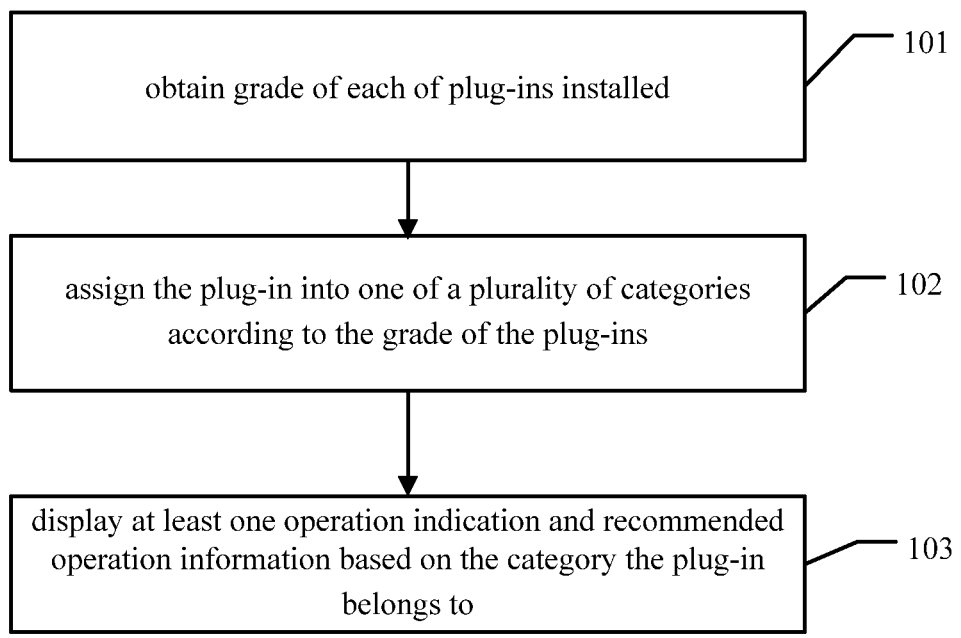
FIG. 1 is a flowchart illustrating the process of a method for processing data according to an example of the present disclosure.

FIG. 1 is a flowchart illustrating the process of a method for processing data by a computing device according to an example of the present disclosure. Referring now to FIG. 1, with respect to each plug-in installed on the computing device, the method for processing data may include the following steps.

In block 101, the computing device obtains grade of the plug-in. To be noted, the grade of a plug-in can be given by users of the plug-in according to their using experiences.

In block 102, the computing device assigns the plug-in into one of a plurality of categories according to the grade of the plug-ins. According to an example of the present disclosure, the computing device may divide all the plug-ins installed on the computing device into three categories: a category with a good reputation, a category with a normal reputation and a category with a bad reputation. And the computing device may divides the plug-ins by the following steps: first, the plug-ins with grades no less than a first preset threshold are divided into a first category; the plug-ins with grades less than the first preset threshold but no less than a second preset threshold are divided into a second category; and the plug-ins with grades less than the second preset threshold are divided into a third category. Wherein, the first preset threshold is bigger than the second preset threshold. Specifically, the category with a good reputation may include plug-ins with grades no less than the first preset threshold; the category with a normal reputation may include plug-ins with grades less than the first preset threshold but no less than the second preset threshold; and the category with a bad reputation may include plug-ins with grades less than the second preset threshold. For example, if the total points of the grading is 5, the plug-ins with grades no less than 4 points would be divided into the category with a good reputation; the plug-ins with grades less than 4 points but not less than 2 points would be divided into the category with a normal reputation; and the plug-ins with grades less than 2 points would be divided into the category with a bad reputation. That is, the first preset threshold is 4 points and the second preset threshold is 2 points.

In block 103, the computing device displays at least one operation indication and recommended operation information based on the category the plug-in belongs to. According to an example of the present disclosure, the operation indication may include one of an activating indication, a prohibiting indication and a deleting indication. And the recommended operation information can be used as reference information by the user of the computing device when deciding how to process the plug-in subsequently. For example, if the plug-in is in the category with a good reputation, the recommended operation information can be "recommend to be activated". If the plug-in is in the category with a bad reputation, the recommended operation information can be "recommend to be deleted". And if the plug-in is in the category with a normal reputation, the recommended operation information can be "recommend to be prohibited".

Further, with respect to each plug-in, the computing device may display one, two or all the three operation indication including activating indication, the prohibiting indication and the deleting indication. For example, with respect to an activated plug-in, the computing device can display at least one of the prohibiting indication and the deleting indication. Specifically, if the plug-in is in the category with a good reputation, the computing device may display only the prohibiting indication. While if the plug-in is in the category with a bad reputation, the computing device may display only the deleting indication. And if the plug-in is in the category with a normal reputation, the computing device may display both the prohibiting indication and the deleting indication. With respect to a prohibited plug-in, the computing device can display at least one of the activating indication and the deleting indication. Specifically, if the plug-in is in the category with a good reputation, the computing device may display only the activating indication. While if the plug-in is in the category with a bad reputation, the computing device may display only the deleting indication. And if the plug-in is in the category with a normal reputation, the computing device may display both the activating indication and the deleting indication.

It can be seen that after the at least one of an activating indication, a prohibiting indication and a deleting indication are displayed, the user of the computing device can choose to activate, to prohibit or to delete the plug-in by pressing/clicking the displayed operation indication according to the recommended operation information.

According to an example of the present disclosure, with respect to a plug-in in the category with a good reputation, the computing device may recommend the user to activate the plug-in. With respect to a plug-in in the category with a normal reputation, the computing device may recommend the user to prohibit the plug-in if the user of the computing device is not sure whether the plug-in is useful or not. And the user may re-activate the plug-in whenever he needs to use it. While with respect to a plug-in in the category with a bad reputation, the computing device may recommend the user to delete the plug-in to save space in memory.

According to the above method for processing data, with respect to each plug-in, the computing device would display at least one of an activating indication, a prohibiting indication and a deleting indication, thus the user may choose to activate, to prohibit or to delete the plug-in according to the recommended operation information displayed. Especially, if a user does not need a plug-in at that time, the user may prohibit the plug-in first rather than delete it, and then re-activate it whenever he needs to use it. Thus the operation procedure of the user is greatly simplified. Specifically, when a plug-in is not frequently used and the plug-in is active all the time, the computing device would be greatly slow down. And if a plug-in is not frequently used and the plug-in is deleted directly, the computing device should re-install the plug-in when the user needs to use it. While according to an example of the present disclosure the plug-in would be prohibited temporally and re-activated when the user needs to use it.

According to an example of the present disclosure, the method may further include: the computing device receives an operation instruction from a user of the computing device about how to process one of the plug-ins installed. Specifically, the operation instruction may include one of an activating instruction, a prohibit instruction and a deleting instruction. In this example, the computing device would take a proper operation on the one of the plug-ins installed, such as activate, prohibit or delete the plug-in according to the operation instruction received from the user. Specifically, if an activating instruction is received, the computing device would activate the plug-in; if a prohibiting instruction is received, the computing device would prohibit the plug-in; and if a deleting instruction is received, the computing device would delete the plug-in.

Specifically, according to an example of the present disclosure, the computing device may activate a plug-in by the following steps:

First, the computing device obtains an ID of the plug-in to be activated.

The computing device searches a configuration file for an original path, a target path and registry information of the plug-in to be activated according to the ID of the plug-in obtained. Wherein the original path of the plug-in to be activated is the path where files corresponding to the plug-in to be activated were originally stored; the target path of the plug-in to be activated is the path where the files corresponding to the plug-in to be activated were backed-up.

The computing device then deletes the original path, the target path and the registry information of the plug-in to be activated from the configuration file.

The computing device moves the files corresponding to the plug-in to be activated from the target path to the original path, and deletes the files corresponding to the plug-in to be activated backed-up on the target path.

And finally, the computing device re-creates a registry according to the registry information of the plug-in to be activated.

To be noted, according to an example of the present disclosure, each plug-in has a unique ID to identify itself.

In the above method, the registry information may include: a key, value, type and other information of the plug-in to be activated.

Additionally, the method of activating a plug-in may further include the step of the computing device loading the configuration file and decoding the configuration file after obtaining the ID of the plug-in to be activated.

The method may further include the step of the computing device encoding the configuration file after deleting the original path, the target path and the registry information of the plug-in to be activated from the configuration file.

Specifically, according to an example of the present disclosure, the computing device may prohibit a plug-in by the following steps:

First, the computing device obtains an ID of the plug-in to be prohibited and then obtains files corresponding to the plug-in to be prohibited and registry information of the plug-in to be prohibited according to the ID of the plug-in.

The computing device then records in the configuration file an original path and a target path, and also records in the configuration file the files corresponding to the plug-in to be prohibited and the registry information of the plug-in. Wherein the original path of the plug-in to be prohibited is the path where the files corresponding to the plug-in to be prohibited is stored and the target path of the plug-in to be prohibited is the path where the files corresponding to the plug-in to be prohibited are to be backed-up.

The computing device backs up the files corresponding to the plug-in to be prohibited to the target path and deletes the files corresponding to the plug-in to be prohibited and the registry information stored on the original path.

According to an example of the present disclosure, the method may further include the step of the computing device loading the configuration file and decoding the configuration file after obtaining the files corresponding to the plug-in to be prohibited and registry information of the plug-in to be prohibited according to the ID of the plug-in.

The method may further include the step of the computing device encoding the configuration file after recording in the configuration file the original path, the target path, the files corresponding to the plug-in to be prohibited and the registry information of the plug-in.

Figure 2:
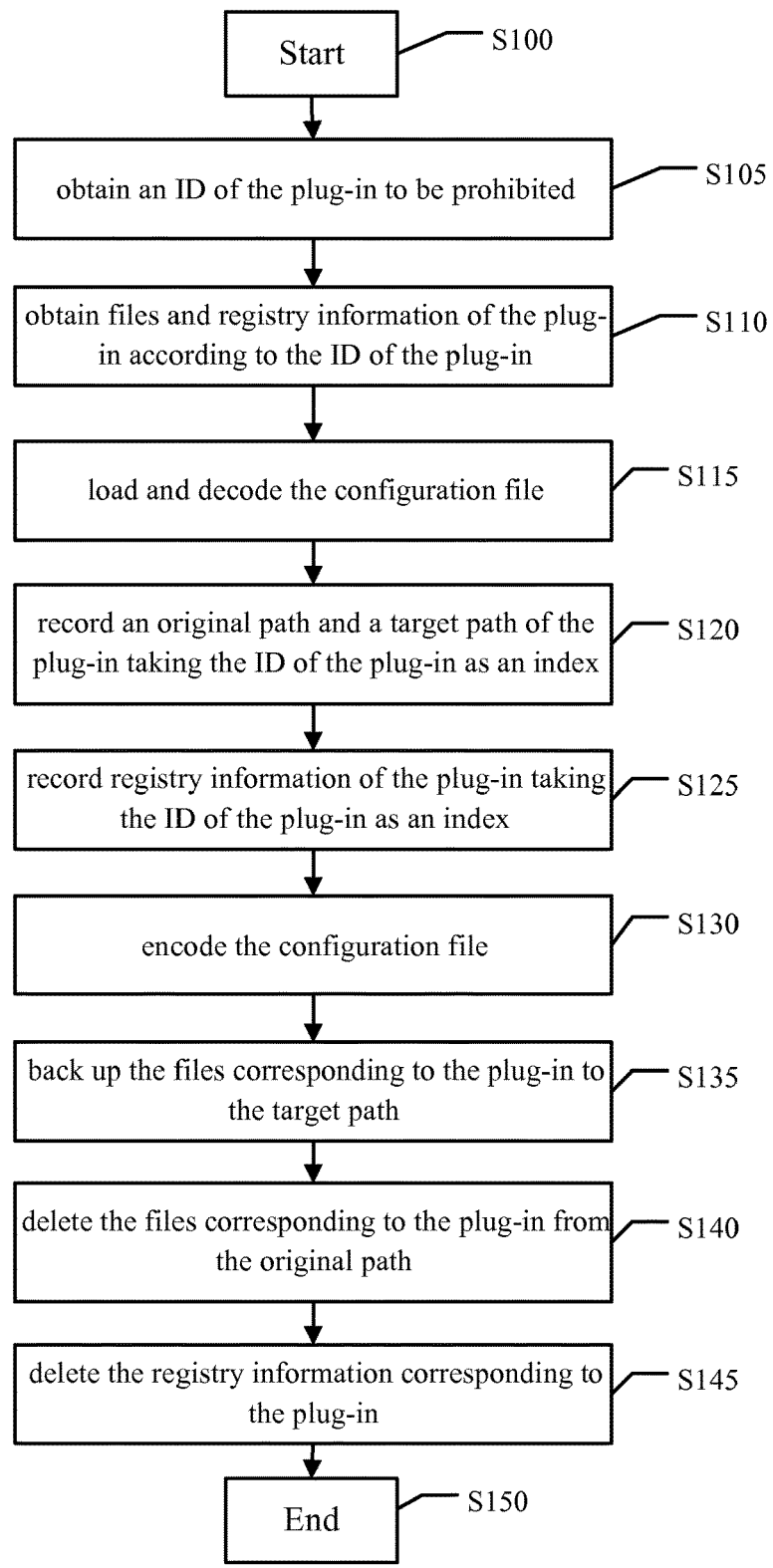
FIG. 2 is a flowchart illustrating the process of a method for processing data according to another example of the present disclosure.

FIG. 2 is a flowchart illustrating the procedure of prohibiting a plug-in.

In block S100, the prohibiting procedure begins.

In block S105, the computing device obtains an ID of the plug-in to be prohibited, wherein each plug-in has a unique ID.

In block S110, the computing device obtains files corresponding to the plug-in to be prohibited and registry information of the plug-in to be prohibited according to the ID of the plug-in to be prohibited from a plug-in database. The plug-in database is a database storing the files corresponding to all plug-ins and registry information of all plug-ins. The plug-in database can be stored in a server. The plug-in database can also be downloaded from the server by a client and then stored in the client.

In block S115, the computing device loads and decodes the configuration file. One can understand that security can be improved by encoding the configuration file.

In block S120, the computing device records an original path and a target path of the plug-in to be prohibited taking the ID of the plug-in to be prohibited as an index. Wherein, the original path of the plug-in to be prohibited is the path where the files corresponding to the plug-in to be prohibited are stored; the target path of the plug-in to be prohibited is the path where the files corresponding to the plug-in to be prohibited are to be backed-up. Specifically, in block S120, the ID of the plug-in, the original path and the target path are stored connectedly.

In block S125, the computing device records registry information of the plug-in to be prohibited taking the ID of the plug-in as an index. Specifically, in block S125, the ID of the plug-in, the registry information corresponding to the plug-in are stored connectedly.

In block S130, the computing device encodes the configuration file.

In block S135, the computing device backs up the files corresponding to the plug-in to be prohibited to the target path.

In block S140, the computing device deletes the files corresponding to the plug-in from the original path.

In block S145, the computing device deletes the registry information corresponding to the plug-in.

In block S150, the prohibiting procedure ends.

Figure 3:
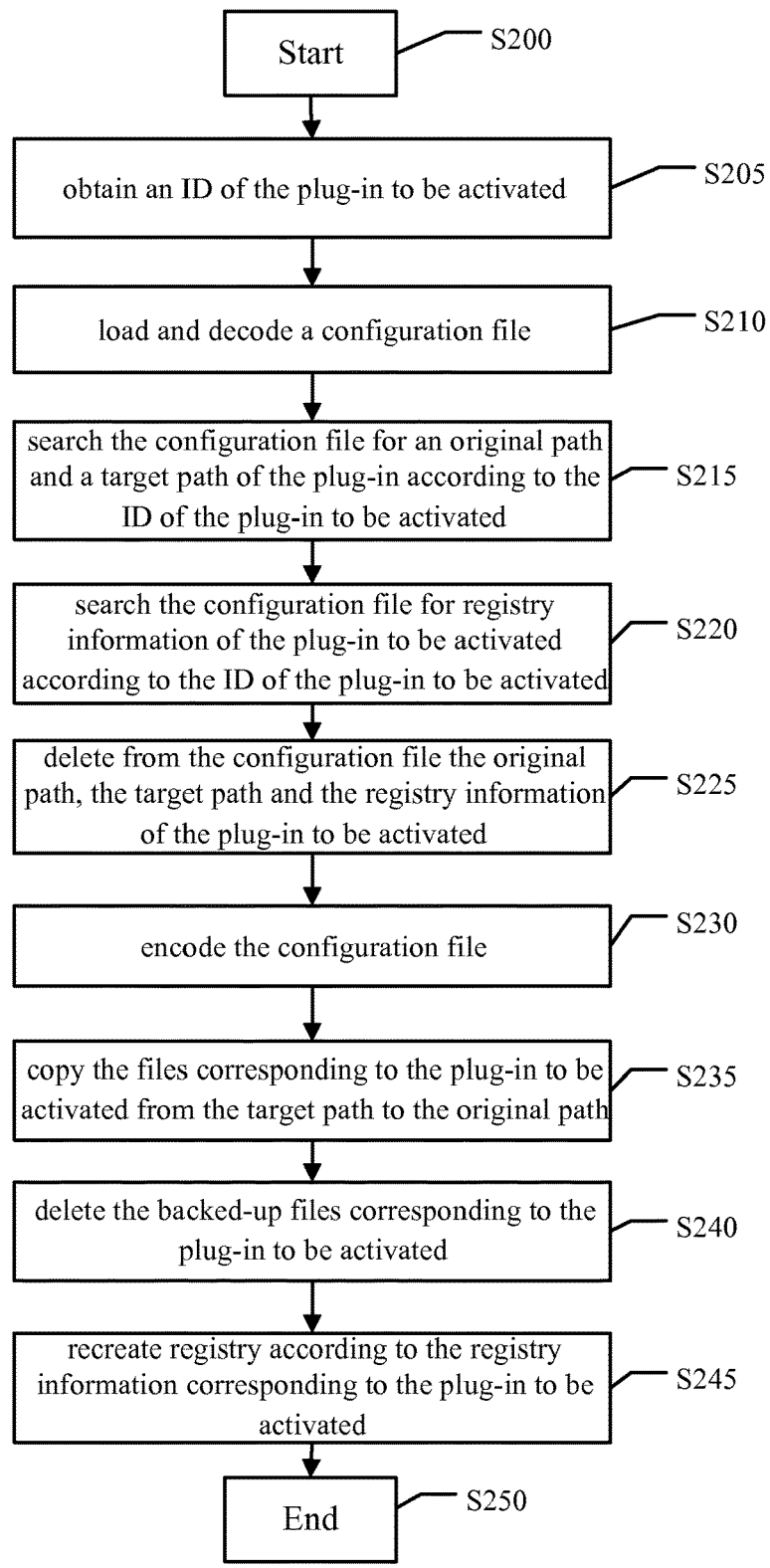
FIG. 3 is a flowchart illustrating the process of a method for processing data according to still another example of the present disclosure.

FIG. 3 is a flowchart illustrating the procedure of activating a plug-in.

In block S200, the activating procedure begins.

In block S205, the computing device obtains an ID of the plug-in to be activated.

In block S210, the computing device loads and decodes a configuration file.

In block S215, the computing device searches the configuration file for an original path and a target path of the plug-in according to the ID of the plug-in to be activated. Wherein the original path of the plug-in is the path where files corresponding to the plug-in were originally stored; the target path of the plug-in is the path where the files corresponding to the plug-in were backed-up.

In block S220, the computing device searches the configuration file for registry information of the plug-in to be activated according to the ID of the plug-in to be activated.

In block S225, the computing device deletes from the configuration file the original path, the target path and the registry information of the plug-in to be activated.

In block S230, the computing device encodes the configuration file.

In block S235, the computing device copies the files corresponding to the plug-in to be activated from the target path to the original path.

In block S240, the computing device deletes the backed-up files corresponding to the plug-in to be activated.

In block S245, the computing device recreates registry according to the registry information corresponding to the plug-in to be activated.

In block S250, the activating process ends.

Figure 4:
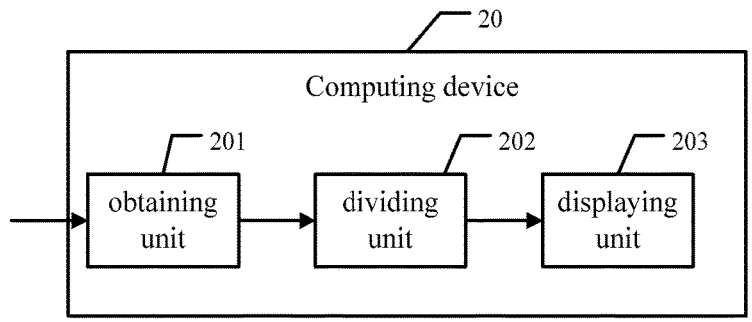
FIG. 4 is a schematic diagram illustrating the structure of a computing device for processing data according to an example of the present disclosure.

FIG. 4 is a schematic diagram illustrating the structure of a computing device according to an example of the present disclosure. Referring to FIG. 4, the computing device may include an obtaining unit 201, a dividing unit 202 and a displaying unit 203 to process each of the plug-ins installed on the computer device.

The obtaining unit 201 is configured to obtain grade of a plug-in.

The dividing unit 202 is configured to assign the plug-in into one of a plurality of categories according to the grade of the plug-in.

The displaying unit 203 is configured to display at least one operation indication and recommended operation information based on the category the plug-in belongs to, wherein the operation indication may include one of an activating indication, a prohibiting indication and a deleting indication.

According to an example of the present disclosure, with respect to each plug-in installed on the computing device, the obtaining unit 201 obtains the grade of the plug-in; the dividing unit 202 assigns the plug-in into one of a plurality of categories according to the grade of the plug-in; the displaying unit 203 then displays at least one of an activating indication, a prohibiting indication and a deleting indication. Further, the displaying unit 203 further displays recommended operation information based on the category the plug-in belongs to. According to the present disclosure, the computing device may process the plug-in installed by activating it, prohibiting it, or deleting it. For example, if a plug-in is not useful to the user of the computing device, the user may choose to prohibit it first, and then re-activate it whenever he needs to use it. Thus the procedure is greatly simplified.

Figure 5:
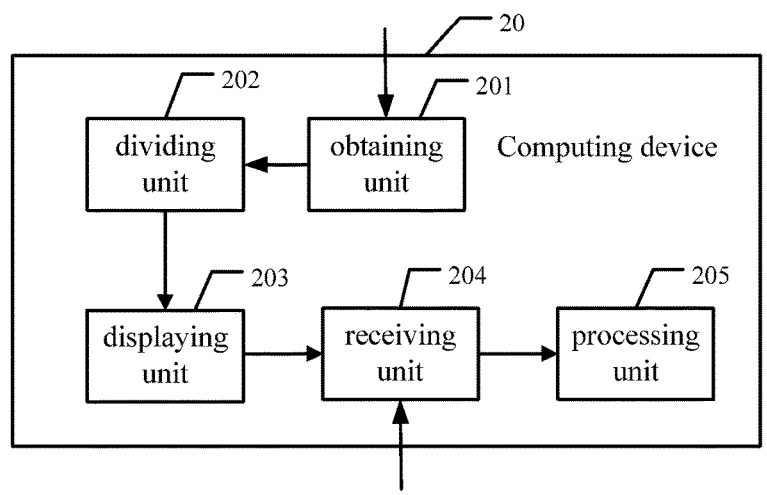
FIG. 5 is a schematic diagram illustrating the structure of a computing device for processing data according to another example of the present disclosure.

FIG. 5 is a schematic diagram illustrating the structure of a computing device according to another example of the present disclosure. According to FIG. 5, the computing device 20 also includes an obtaining unit 201, a dividing unit 202 and a displaying unit 203. And the computing device 20 may also include a receiving unit 204 and a processing unit 205.

The receiving unit 204 is configured to receive an operation instruction of a plug-in from a user of the computing device after the at least one of the activating indication, a prohibiting indication and a deleting indication is displayed. Wherein, the operation instruction includes one of an activating instruction, a prohibiting instruction and a deleting instruction.

The processing unit 205 is configured to take a proper operation on the plug-in according to the operation instruction received. Specifically, if an activating instruction is received, the computing device would activate the plug-in; if a prohibiting instruction is received, the computing device would prohibit the plug-in; and if a deleting instruction is received, the computing device would delete the plug-in.

Figure 6:
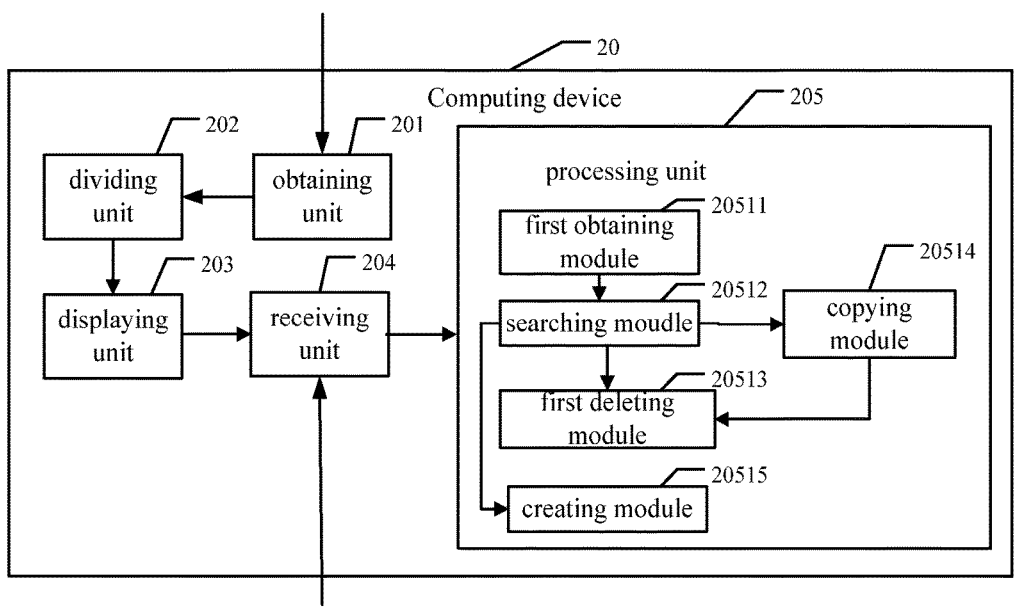
FIG. 6 is a schematic diagram illustrating the structure of a computing device for processing data according to still another example of the present disclosure.

FIG. 6 is a schematic diagram illustrating the structure of the computing device according to still another example of the present disclosure. In FIG. 6, the structure of the processing unit 205 is illustrated. According to FIG. 6, the processing unit 205 may include a first obtaining module 20511, a searching module 20512, a first deleting module 20513, a copying module 20514, and a creating module 20515.

The first obtaining module 20511 is configured to obtain an ID of the plug-in to be processed.

The searching module 20512 is configured to search a configuration file for an original path, a target path and registry information of the plug-in to be processed. Wherein, the original path of the plug-in is the path where files corresponding to the plug-in to be prohibited were originally stored; the target path of the plug-in to be prohibited is the path where the files corresponding to the plug-in to be prohibited were backed-up.

The first deleting module 20513 is configured to delete the original path, the target path and the registry information obtained by the searching module 20512 from the configuration file.

The copying module 20514 is configured to copy the files corresponding to the plug-in to be processed from the target path to the original path.

Further, the first deleting module 20513 is further configured to delete the backed-up files corresponding to the plug-in to be processed after the copying module 20514 copies the files to the original path.

The creating module 20515 is configured to recreate a registry according to the registry information of the plug-in to be processed found by the searching module 20512.

Figure 7:
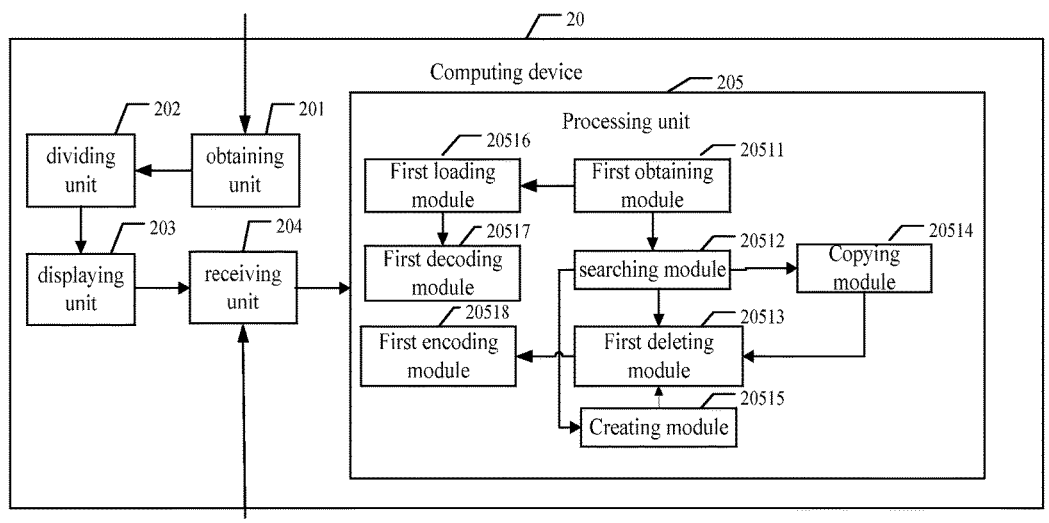
FIG. 7 is a schematic diagram illustrating the structure of a computing device for processing data according to yet another example of the present disclosure.

FIG. 7 is a schematic diagram illustrating the structure of the computing device according to yet another example of the present disclosure. In FIG. 7, the structure of the processing unit 205 is illustrated. According to FIG. 7, the processing unit 205 also includes a first obtaining module 20511, a searching module 20512, a first deleting module 20513, a copying module 20514, and a creating module 20515. Further, the processing unit 205 may further includes a first loading module 20516, a first decoding module 20517 and a first coding module 20518.

The first loading module 20516 is configured to loading the configuration file after the first obtaining module 20511 obtains the ID of the plug-in to be processed.

The first decoding module 20517 is configured to decode the configuration file after the first loading module 20516 loads the configuration file.

The first encoding module 20518 is configured to encode the configuration file after the first deleting module 20513 deletes the original path, the target path and the registry information.

Figure 8:
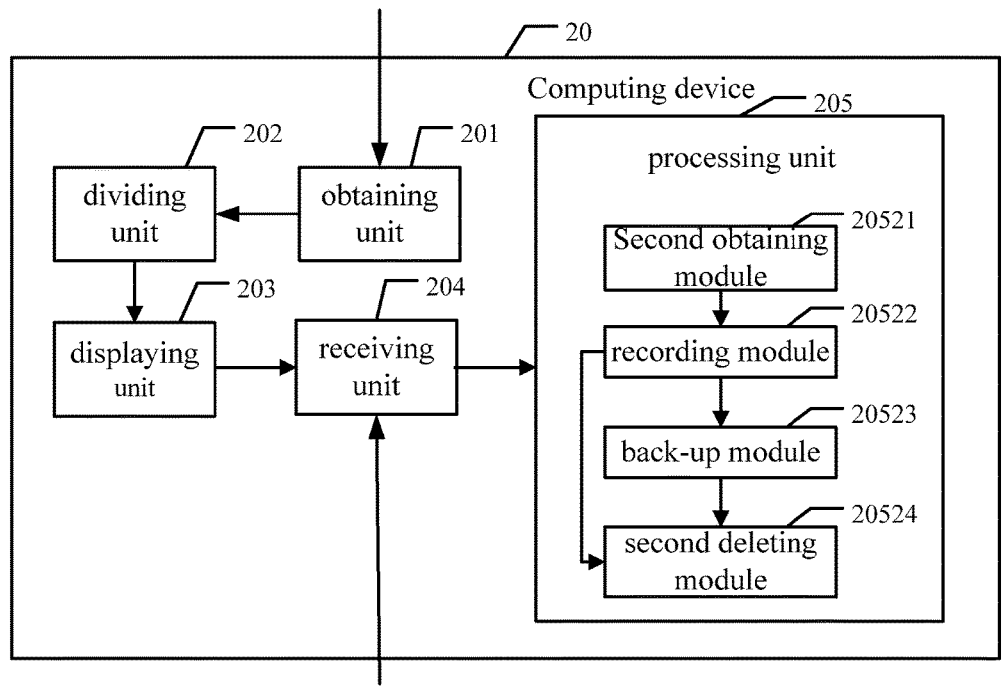
FIG. 8 is a schematic diagram illustrating the structure of a computing device for processing data according to another example of the present disclosure.

FIG. 8 is a schematic diagram illustrating the structure of the computing device according to still another example of the present disclosure. In FIG. 8, the structure of the processing unit 205 is also illustrated. According to FIG. 8, the processing unit 205 also includes a second obtaining module 20521, a recording module 20522, a back-up module 20523 and a second deleting module 20524.

The second obtaining module 20521 is configured to obtain the ID of the plug-in to be processed and obtain files and registry information corresponding to the plug-in to be processed according to the ID of the plug-in to be processed.

The recording module 20522 is configured to record in the configuration file the original path, the target path and the registry information found by the searching module 20512 and record in the configuration file the files and registry information corresponding to the plug-in to be processed.

The back-up module 20523 is configured to back up the files obtained by the second obtaining module 20521 on the target path after the recording module 20522 records the registry information.

The second deleting module 20524 is configured to delete the files corresponding to the plug-in and the registry information of the plug-in to be processed from the original path after the back-up module 20523 backs up the files.

Figure 9:
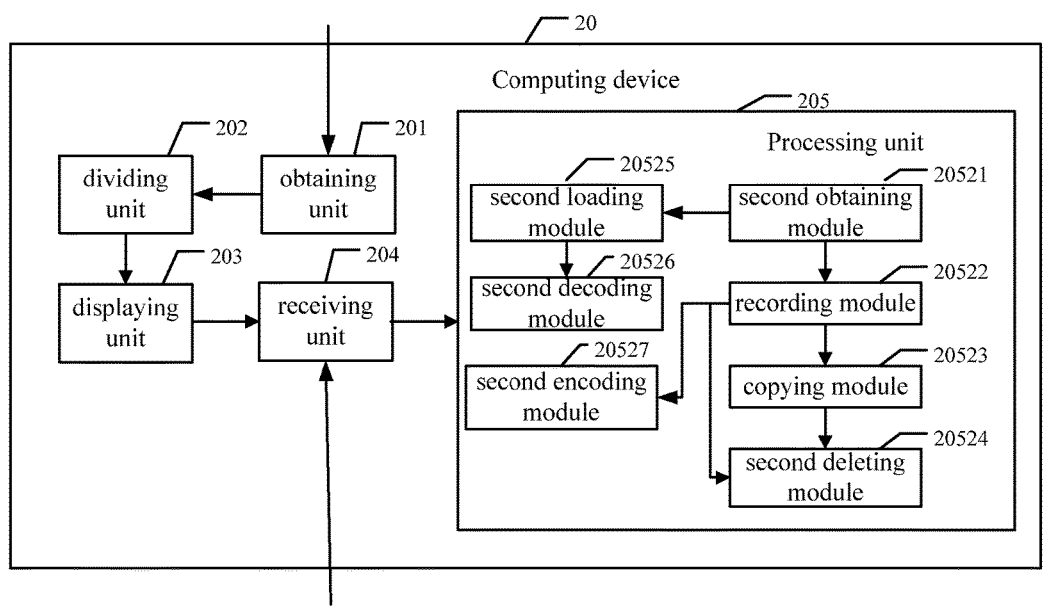
FIG. 9 is a schematic diagram illustrating the structure of a computing device for processing data according to an example of the present disclosure.

FIG. 9 is a schematic diagram illustrating the structure of the computing device according to an example of the present disclosure. In FIG. 9, the structure of the processing unit 205 is also illustrated. According to FIG. 9, the processing unit 205 also includes a first obtaining module 20511, a searching module 20512, a first deleting module 20513, a copying module 20514, a creating module 20515, a second obtaining module 20521, a recording module 20522, a back-up module 20523 and a second deleting module 20524. Further, the processing unit 205 may further includes a second loading module 20525, a second decoding module 20526 and a second encoding module 20527.

The second loading module 20525 is configured to load the configuration file after the second obtaining module 20521 obtains the files and registration information corresponding to the plug-in to be processed.

The second decoding module 20526 is configured to decode the configuration file loaded by the second loading module 20525.

The second encoding module 20527 is used to encode the configuration file after the recording module 20522 recording the original path, the target path and the registry information.

According to the above description of the present disclosure, with respect to each plug-in, the computing device would display at least one of an activating indication, a prohibiting indication and a deleting indication, thus the user may choose to activate, to prohibit or to delete the plug-in according to the category that the plug-in belongs to. Especially, if a user does not need a plug-in at that time, the user may prohibit the plug-in first rather than delete it, and then re-activate it when he needs to use it. Thus the operation procedure of the user is greatly simplified.

Figure 10:
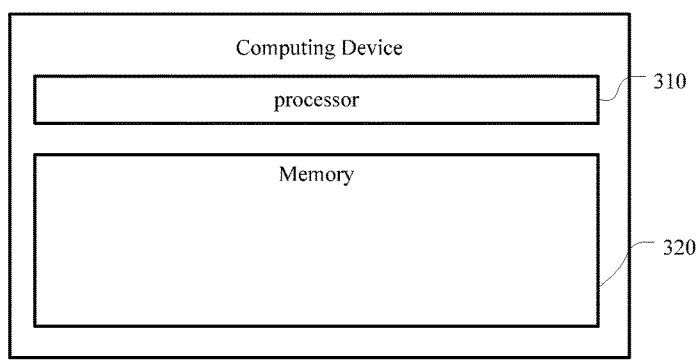
FIG. 10 is a schematic diagram illustrating the structure of a computing device for processing data according to another example of the present disclosure.

FIG. 10 is a schematic diagram illustrating a structure of a computing device for processing data according to another example of the present disclosure. As shown in FIG. 10, the computing device includes at least one processor 310 and a memory 320. The memory 320 includes one or more programs executed by the at least one processor 310, the one or more programs include instructions to perform acts of the above described method for processing data. For example, the one or more programs may include instructions to: obtain grade of a plug-in; assign the plug-in into one of a plurality of categories according to the grade of the plug-in; and display at least one operation indication and recommended operation information based on the category the plug-in belongs to.

The one or more programs may further include instructions to: receive an operation instruction from a user of the computing device about how to process one of the plug-ins installed and take a proper operation on the one of the plug-ins installed, such as activate, prohibit or delete the plug-in according to the operation instruction received from the user.

The present disclosure also provides a non-transitory computer-readable storage medium comprising a set of instructions for managing network acceleration software, the set of instructions to direct at least one processor to perform acts of the above described method for processing data.

The foregoing description, for purpose of explanation, has been described with reference to specific examples. However, the illustrative discussions above are not intended to be exhaustive or to limit the present disclosure to the precise forms disclosed. Many modifications and variations are possible in view of the above teachings. The examples were chosen and described in order to best explain the principles of the present disclosure and its practical applications, to thereby enable others skilled in the art to best utilize the present disclosure and various examples with various modifications as are suited to the particular use contemplated.

The above examples may be implemented by hardware, software, firmware, or a combination thereof. For example the various methods, processes and functional modules described herein may be implemented by a processor (the term processor is to be interpreted broadly to include a CPU, processing unit/module, ASIC, logic module, or programmable gate array, etc.). The processes, methods and functional modules may all be performed by a single processor or split between several processors; reference in this disclosure or the claims to a 'processor' should thus be interpreted to mean 'one or more processors'. The processes, methods and functional modules are implemented as machine readable instructions executable by one or more processors, hardware logic circuitry of the one or more processors or a combination thereof. The modules, if mentioned in the aforesaid examples, may be combined into one module or further divided into a plurality of sub-modules. Further, the examples disclosed herein may be implemented in the form of a software product. The computer software product is stored in a non-transitory storage medium and comprises a plurality of instructions for making an electronic device implement the method recited in the examples of the present disclosure.

What is claimed is:

1. A method for processing data by a computing device, comprising:
   obtaining, by the computing device, grade of a plug-in, wherein the grade is given by users of the plug-in according to using experiences of the users;
   assigning, by the computing device, the plug-in into one of a plurality of categories according to the grade of the plug-in; and
   displaying, by the computing device, at least one operation indication and recommended operation information based on the category the plug-in belongs to, wherein different operation indication and recommended operation information is displayed to plug-ins belonging to different categories, the method further comprising:
   receiving an operation instruction of a plug-in; and
   processing the plug-in according to the operation instruction of the plug-in, by activating the plug-in according to the activating instruction of the plug-in,
   wherein activating the plug-in according to the activating instruction of the plug-in comprises,
   obtaining an ID of the plug-in,
   searching a configuration file for an original path, a target path and registry information of the plug-in according to the ID of the plug-in, wherein the original path is the path where files corresponding to the plug-in were originally stored; the target path is the path where the files were backed-up,
deleting the original path, the target path, and the registry information found from the configuration file,
copying the files corresponding to the plug-in on the target path to the original path,
deleting the files corresponding to the plug-in on the target path,
recreating a registry according to the registry information found corresponding to the plug-in,
loading the configuration file and decoding the configuration file after the ID of the plug-in is obtained, and
encoding the configuration file after the original path, the target path, and the registry information are deleted from the configuration file.

2. The method according to claim 1, wherein the operation indication comprises: of an activating indication, a prohibiting indication and a deleting indication.

3. The method according to claim 2, further comprising:
receiving an operation instruction of a plug-in; and
processing the plug-in according to the operation instruction of the plug-in.

4. The method according to claim 1, wherein processing the plug-in according to the operation instruction of the plug-in comprises: prohibiting the plug-in according to a prohibiting instruction of the plug-in.

5. The method according to claim 4, wherein prohibiting the plug-in according to the prohibiting instruction of the plug-in comprises:
obtaining an ID of the plug-in;
obtaining files corresponding to the plug-in and registry information of the plug-in;
recording an original path, and a target path in the configuration file, wherein the original path is the path where files corresponding to the plug-in are stored; the target path is the path where the files are to be backed-up;
recording the files corresponding to the plug-in and registry information of the plug-in in the configuration file;
backing up the files corresponding to the plug-in on the target path; and
deleting the files corresponding to the plug-in and registry information of the plug-in on the original path.

6. The method according to claim 4, further comprising:
loading the configuration file and decoding the configuration file after the files and the registry information is obtained according to the ID of the plug-in; and
encoding the configuration file after the original path, the target path, the files and the registry information are recorded in the configuration file.

7. A computing device, comprising:
a processor and a non-transitory storage, wherein the non-transitory storage stores one or more computer readable instructions that when executed cause the processor executes the computer readable instructions stored in the non-transitory storage to
obtain grade of a plug-in, wherein the grade is given by users of the plug-in according to using experiences of the users;
assign the plug-in into one of a plurality of categories according to the grade of the plug-in; and
display at least one operation indication and recommended operation information based on the category the plug-in belongs to, wherein different operation indication and recommended operation information is displayed to plug-ins belonging to different categories,
wherein the one or more computer readable instructions when executed further cause the processor to:
receive an operation instruction with respect to a plug-in after the at least one operation indication is displayed; and
process the plug-in according to the operation instruction, wherein the one or more computer readable instructions when executed cause the processor to process the plug-in according to the operation instruction include instructions to,
obtain an ID of the plug-in to be processed,
search configuration file for an original path, a target path and registry information of the plug-in to be processed, wherein the original path is the path where files corresponding to the plug-in were originally stored; the target path is the path where the files were backed-up,
delete the original path, the target path and the registry information obtained from the configuration file, and
copy the files corresponding to the plug-in to be processed from the target path to the original path,
delete the files corresponding to the plug-in on the target path,
recreate a registry according to the registry information corresponding to the plug-in to be processed,
load the configuration file after obtaining the ID of the plug-in to be processed,
decode the configuration file after loading the configuration file, and
encode the configuration file after deleting the original path, the target path and the registry information.

8. The computing device according to claim 7, wherein the one or more computer readable instructions include instructions that when executed cause the processor wherein the processor executes the computer readable instructions stored in the non-transitory storage to delete the files corresponding to the plug-in to be processed after copying the files to the original path.

9. The computing device according to claim 7, wherein the one or more computer readable instructions include instructions that when executed cause the processor to wherein the processor executes the computer readable instructions stored in the non-transitory storage to:
obtain the ID of the plug-in to be processed and obtain files and registry information corresponding to the plug-in to be processed according to the ID of the plug-in to be processed;
record in the configuration file an original path, a target path and the registry information and record in the configuration file the files and registry information corresponding to the plug-in to be processed, wherein the original path is the path where files corresponding to the plug-in are stored; the target path is the path where the files are to be backed-up;
back up the files obtained from the original path to the target path after recording the registry information of the files; and
delete the files and the registry information corresponding to the plug-in to be processed from the original path after backing-up the files.

10. The computing device according to claim 9, wherein the one or more computer readable instructions include instructions that when executed cause the processor to wherein the processor executes the computer readable instructions stored in the non-transitory storage to:
load the configuration file after obtaining the files and registration information of the files corresponding to the plug-in to be processed decode the loaded configuration file
encode the configuration file after recording the original path, the target path and the registry information.

11. A computing device for processing data, comprising:
at least one processor;
a memory; and
one or more programs stored in the memory and to be executed by the at least one processor, the one or more programs comprise instructions to:
obtain grade of a plug-in, wherein the grade is given by users of the plug-in according to using experiences of the users;
assign the plug-in into one of a plurality of categories according to the grade of the plug-in; and
display at least one operation indication and recommended operation information based on the category the plug-in belongs to, wherein different operation indication and recommended operation information is displayed to plug-ins belonging to different categories, wherein the one or more programs comprise instructions to:
receive an operation instruction with respect to a plug-in after the at least one operation indication is displayed; and
process the plug-in according to the operation instruction, wherein the one or more computer readable instructions when executed cause the processor to process the plug-in according to the operation instruction include instructions to,
obtain an ID of the plug-in to be processed,
search configuration file for an original path, a target path and registry information of the plug-in to be processed, wherein the original path is the path where files corresponding to the plug-in were originally stored; the target path is the path where the files were backed-up,
delete the original path, the target path and the registry information obtained from the configuration file, and
copy the files corresponding to the plug-in to be processed from the target path to the original path,
delete the files corresponding to the plug-in on the target path,
recreate a registry according to the registry information corresponding to the plug-in to be processed,
load the configuration file after obtaining the ID of the plug-in to be processed,
decode the configuration file after loading the configuration file, and
encode the configuration file after deleting the original path, the target path and the registry information.

12. A non-transitory computer-readable storage medium comprising a set of instructions for processing data, the set of instructions to direct at least one processor to perform acts of:
obtaining grade of a plug-in, wherein the grade is given by users of the plug-in according to using experiences of the users;
assigning the plug-in into one of a plurality of categories according to the grade of the plug-in;
displaying at least one operation indication and recommended operation information based on the category the plug-in belongs to, wherein different operation indication and recommended operation information is displayed to plug-ins belonging to different categories;
receiving an operation instruction of a plug-in; and
processing the plug-in according to the operation instruction of the plug-in, by activating the plug-in according to the activating instruction of the plug-in,
wherein activating the plug-in according to the activating instruction of the plug-in comprises,
obtaining an ID of the plug-in,
searching a configuration file for an original path, a target path and registry information of the plug-in according to the ID of the plug-in, wherein the original path is the path where files corresponding to the plug-in were originally stored; the target path is the path where the files were backed-up,
deleting the original path, the target path, and the registry information found from the configuration file,
copying the files corresponding to the plug-in on the target path to the original path,
deleting the files corresponding to the plug-in on the target path,
recreating a registry according to the registry information found corresponding to the plug-in,
loading the configuration file and decoding the configuration file after the ID of the plug-in is obtained, and
encoding the configuration file after the original path, the target path, and the registry information are deleted from the configuration file.

* * * * *